(12) United States Patent  
Sasaki

(10) Patent No.: US 8,737,734 B2  
(45) Date of Patent: May 27, 2014

(54) COLOR PROCESSING APPARATUS AND METHOD, AND COMPUTER READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 185 days.

(21) Appl. No.: 13/470,947

(22) Filed: May 14, 2012

(65) Prior Publication Data

US 2013/0142429 A1     Jun. 6, 2013

(30) Foreign Application Priority Data

Dec. 2, 2011   (JP) .................................. 2011-265178

(51) Int. Cl.
*G06K 9/00*     (2006.01)

(52) U.S. Cl.
USPC .............................. 382/167; 358/1.9; 358/518

(58) Field of Classification Search
None
See application file for complete search history.

(56) References Cited

U.S. PATENT DOCUMENTS

| | | | |
|---|---|---|---|
| 6,480,301 B1 * | 11/2002 | Cholewo | 358/1.9 |
| 8,223,396 B2 * | 7/2012 | Kishimoto | 358/1.9 |
| 2005/0062992 A1 * | 3/2005 | Kishimoto et al. | 358/1.9 |
| 2006/0061786 A1 * | 3/2006 | Cho et al. | 358/1.9 |
| 2006/0119870 A1 * | 6/2006 | Ho et al. | 358/1.9 |
| 2008/0112025 A1 * | 5/2008 | Kishimoto | 358/518 |
| 2008/0112026 A1 * | 5/2008 | Kishimoto | 358/518 |
| 2009/0002390 A1 * | 1/2009 | Kuno | 345/593 |
| 2009/0285475 A1 * | 11/2009 | Suzuki | 382/162 |
| 2010/0201999 A1 | 8/2010 | Sasaki | |
| 2010/0328341 A1 * | 12/2010 | Stauder et al. | 345/593 |
| 2013/0194321 A1 * | 8/2013 | Wan et al. | 345/690 |

FOREIGN PATENT DOCUMENTS

| | | |
|---|---|---|
| JP | 10-262157 A | 9/1998 |
| JP | 2002-084434 A | 3/2002 |
| JP | 2003-008912 A | 1/2003 |
| JP | 2005-063093 A | 3/2005 |
| JP | 2009-303019 A | 12/2009 |
| JP | 2010-187144 A | 8/2010 |
| JP | 2010-252309 A | 11/2010 |
| JP | 2011-009843 A | 1/2011 |

* cited by examiner

*Primary Examiner* — Sean Motsinger

(74) *Attorney, Agent, or Firm* — Sughrue Mion, PLLC

(57) ABSTRACT

A color processing apparatus includes the following elements. A point group generator generates a point group existing in a color gamut of an output apparatus. A design point group extracting unit extracts, from the point group, a design point group that satisfies predetermined design conditions. A corresponding point group setting unit sets, on the basis of the design point group, a corresponding point group indicating a boundary of a color gamut represented by the design point group, such that points of the corresponding point group are associated with individual points of a boundary point group existing on a boundary of the color gamut of the output apparatus. A design color gamut boundary generator generates a boundary of a design color gamut that satisfies the predetermined design conditions, by using a set of the boundary point group and the corresponding point group.

9 Claims, 14 Drawing Sheets

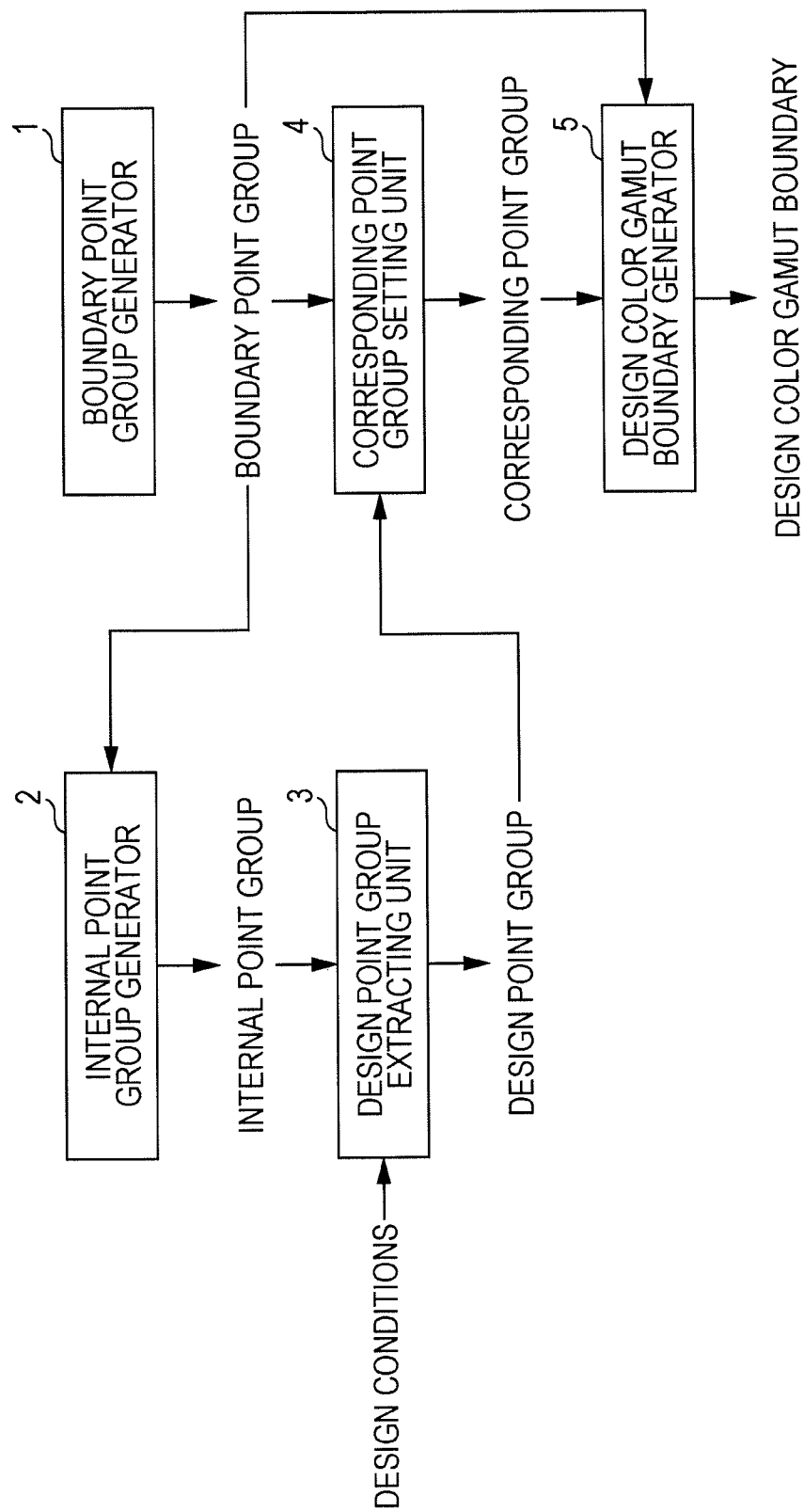

COLOR PROCESSING APPARATUS AND METHOD, AND COMPUTER READABLE MEDIUM

CROSS-REFERENCE TO RELATED APPLICATIONS

This application is based on and claims priority under 35 USC 119 from Japanese Patent Application No. 2011-265178 filed Dec. 2, 2011.

BACKGROUND (i) Technical Field

The present invention relates to a color processing apparatus and method and a computer readable medium.

(ii) Related Art

Generally, an output apparatus outputs color images by using basic color components, such as cyan (C), magenta (M), and yellow (Y), and red (R), green (G), and blue (B), and such basic color components are necessary for outputting color images. An output apparatus using C, M, and Y as basic color components, for example, may use other color components. A color gamut, which is a range of colors reproduced by an output apparatus, may be represented, not only by basic color components, but also by a black (K) component or by a specific color component, such as an orange (O), green (G), or violet (V) component. By the use of the K component, the brightness becomes lower than that when the color gamut is represented only by the basic color components. By the use of the O, G, or V component, the chroma becomes higher than that when the color gamut is represented only by the basic color components.

When color images are output from an output apparatus, certain conditions (hereinafter called "design conditions") may be added to some color components or all color components. For example, design conditions, such as the total value of color components is equal to or less than a predetermined maximum total value, may be added. As another example of design conditions, a range of values may be applied to each color component. If such conditions are imposed, the color gamut, which is a range of colors reproduced by an output apparatus, may sometimes be narrower than that when such conditions are not imposed. For example, concerning the above-described K component, there may be some colors that are not possible to reproduce if the K component is not used, and such colors are not reproduced if the use of the K component is restricted by the design conditions for the sake of image quality.

There may also be some cases in which a color represented by a color signal supplied to an output apparatus is not included in the color gamut of the output apparatus. In this case, generally, processing for converting such a color into a color included in the color gamut is performed. In order to perform such conversion processing, it is necessary to determine the boundary of the color gamut, which is an interface between colors that are reproduced by an output apparatus and colors that are not reproduced by the output apparatus.

When design conditions are set, the boundary of the color gamut becomes different depending on the types of design conditions. It is thus necessary to determine the boundary of the color gamut in accordance with set design conditions.

SUMMARY

According to an aspect of the invention, there is provided a color processing apparatus including: a point group generator that generates a point group existing in a color gamut of an output apparatus; a design point group extracting unit that extracts, from the point group, a design point group, which is a point group that satisfies predetermined design conditions; a corresponding point group setting unit that sets, on the basis of the design point group, a corresponding point group, which is a point group indicating a boundary of a color gamut represented by the design point group, such that points of the corresponding point group are associated with individual points of a boundary point group existing on a boundary of the color gamut of the output apparatus; and a design color gamut boundary generator that generates a boundary of a design color gamut, which is a color gamut that satisfies the predetermined design conditions, by using a set of the boundary point group and the corresponding point group.

BRIEF DESCRIPTION OF THE DRAWINGS

An exemplary embodiment of the present invention will be described in detail based on the following figures, wherein:

FIG. 1 is a block diagram illustrating an exemplary embodiment of the invention;

DETAILED DESCRIPTION

Figure 2A:
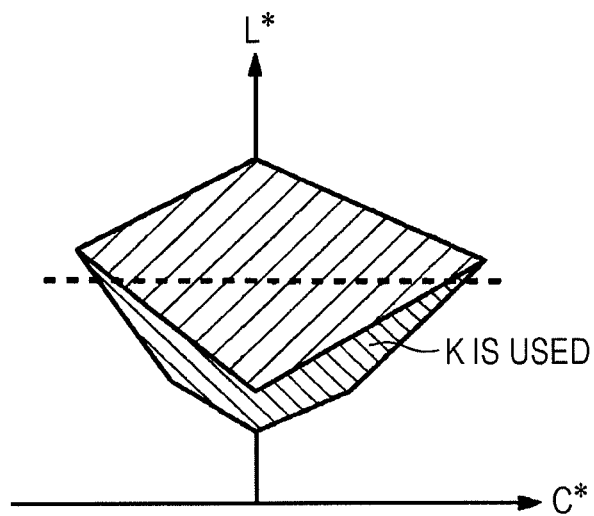
FIGS. 2A and 2B illustrate examples of a color gamut.

FIG. 1 is a block diagram illustrating an example of the configuration of a color processing apparatus according to an exemplary embodiment of the invention. The color processing apparatus includes a boundary point group generator 1, an internal point group generator 2, a design point group extracting unit 3, a corresponding point group setting unit 4, and a design color gamut boundary generator 5. Assume that an output apparatus that outputs color images by using at least basic color components is utilized. If, because of predetermined design conditions, the color gamut output from the output apparatus becomes narrower than that if the design conditions are not imposed, the boundary of a design color gamut, which is a range of colors that satisfies the design conditions, is generated.

The boundary point group generator 1 generates a boundary point group including boundary points that exist on the boundary of the color gamut of the output apparatus. The color gamut of the output apparatus may be a range of colors when no conditions are imposed or a range of colors when conditions different from design conditions are imposed. If design conditions are conditions concerning specific color components, the color gamut of the output apparatus may be a range of colors when the conditions that the total value of the color components is within a predetermined value (maximum total value) are imposed. It is assumed that the boundary of the color gamut of the output apparatus is known and that a boundary point group is set on the known boundary. If a point group existing on the boundary of the color gamut of the output apparatus has already been given, it is used as the boundary point group instead of generating a boundary point group.

The internal point group generator 2 generates an internal point group constituted of internal points positioned within the color gamut of the output apparatus. The internal point group may be generated by using various approaches, for example, it may be generated randomly or regularly. Alternatively, point groups may be generated by using a certain approach, and a point group constituted of points positioned within the color gamut of the output apparatus may be extracted and be utilized as the internal point group.

The design point group extracting unit 3 extracts, from the internal point group generated by the internal point group generator 2, a design point group that satisfies predetermined design conditions. Assume that conditions for color components to be used by the output apparatus are set as the design conditions and that the internal point group is represented by a color space that does not utilize the color components set in the design conditions. In this case, a determination may be made as to whether the conversion of the color space of the internal point group into a color space of the color components used by the output apparatus, under the design conditions, is significant. Then, a point group for which it is determined that the conversion of the color space of such a point group is significant may be extracted and be set as the design point group.

The corresponding point group setting unit 4 sets, on the basis of the design point group extracted by the design point group extracting unit 3, a corresponding point group, which is a point group of a boundary of a color gamut represented by the design point group, such that points forming the set corresponding point group are associated with the individual points of the boundary point group. For example, the corresponding point group setting unit 4 may determine points of the design point group which are separated from the associated points of the boundary point group by the shortest distances as the corresponding point group such that the set corresponding point group is associated with the boundary point group. Alternatively, straight lines extending from the individual points of the boundary point group to a predetermined point positioned inside the color gamut may be set, and corresponding points may be set on the straight lines, thereby forming a corresponding point group. In this case, points of the design point group associated with the points of the boundary point group may be selected on the basis of the distances from the points of the boundary point group to the associated points of the design point group, and on the basis of the selected design points, points of the corresponding point group may be set on the straight lines.

The design color gamut boundary generator 5 generates a design color gamut boundary, which is a boundary of a color gamut that satisfies the design conditions, by using a set of the boundary point group and the corresponding point group. The design color gamut boundary generator 5 may directly utilize the corresponding point group as the design color gamut boundary, or may generate a design color gamut boundary by using a point group different from the corresponding point group. If a new design color gamut boundary is generated, for example, a mapping model from which a corresponding point group is output in response to an input of a boundary point group may be formed, and by using this mapping model, a point group of a boundary of a color gamut that satisfies the design conditions may be mapped from a point group on a boundary of a color gamut of the output apparatus, thereby generating a design color gamut boundary by using the mapped point group.

The above-described configuration will be further described below by way of a specific example. In the following description, it is assumed that point groups are represented by a device-independent color space, e.g., a CIELAB color space, and that the output apparatus utilizes four color components, such as C, M, Y, and K. The design conditions are conditions for the proportion made up of the K component to be used.

Figure 2B:
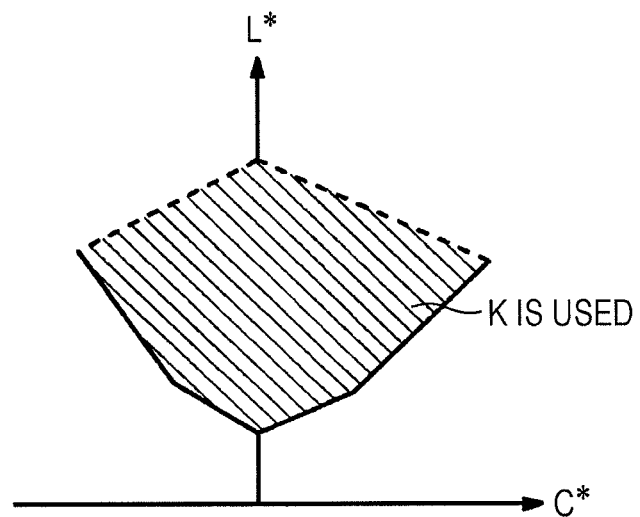

FIGS. 2A and 2B illustrate examples of the color gamut reproduced by an output apparatus. The examples of the color gamut shown in FIGS. 2A and 2B are represented by a plane including the brightness axis in the CIELAB color space. In FIG. 2A, the color range indicated by the hatched portion rising upward to the right is a range of colors reproduced by the three basic C, M, and Y components. In contrast, the color range indicated by the hatched portion falling downward to the right is a range of colors reproduced, not only by the three basic C, M, and Y components, but also by the K component. In the example shown in FIG. 2A, a minimal amount of K component is utilized, and the minimal amount of K component is called the "minimum K". In the example shown in FIG. 2A, considering colors having the brightness indicated by the broken line in FIG. 2A, the K component is not used for the color positioned on the brightness axis, and the K component is used for colors having a higher chroma than that of a certain color.

In the example shown in FIG. 2B, a maximum amount of K component is utilized. Except for the colors of the boundary reproduced by one or two of the C, M, and Y components, the C, M, and Y components are replaced with the K component. Accordingly, except for the boundary indicated by the broken lines, the color gamut is represented by using the K component. The K component which is utilized to the maximum is called "maximum K".

Regardless of the minimum K shown in FIG. 2A or the maximum K shown in FIG. 2B, the configuration and the size of the color gamut remain the same, and in each of the colors, the use of the K component is adjusted in a range from the minimum K to the maximum K.

In the maximum K shown in FIG. 2B, as the chroma rises, the K component increases more slowly than the minimum K shown in FIG. 2A. However, a deterioration in the image quality, such as in the granularity, may occur due to the use of the K component. Accordingly, the proportion made up of the K component to be used is controlled such that it ranges from the minimum K to the maximum K. The proportion made up of the K component to be used in this case is known as the gray component replacement (GCR) rate, and when the color gamut is represented by four C, M, Y, and K components, the K component is often controlled by the GCR rate.

In the range from the minimum K (represented by minK) shown in FIG. 2A to the maximum K (represented by maxK) shown in FIG. 2B, in order to use the color gamut up to the outermost boundary, the amount of K to be used is controlled by the following equation (1):

$$K = \alpha K \times \max K + (1 - \alpha K) \times \min K \quad (1)$$

where $\alpha K$ is the GCR rate determined in accordance with $L^*a^*b^*$.

Figure 3A:
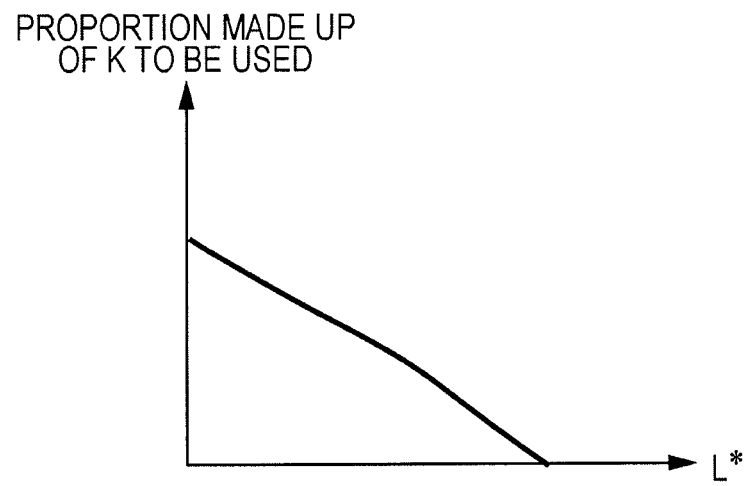
FIGS. 3A and 3B illustrate examples of the proportion made up of K to be used.
Figure 3B:
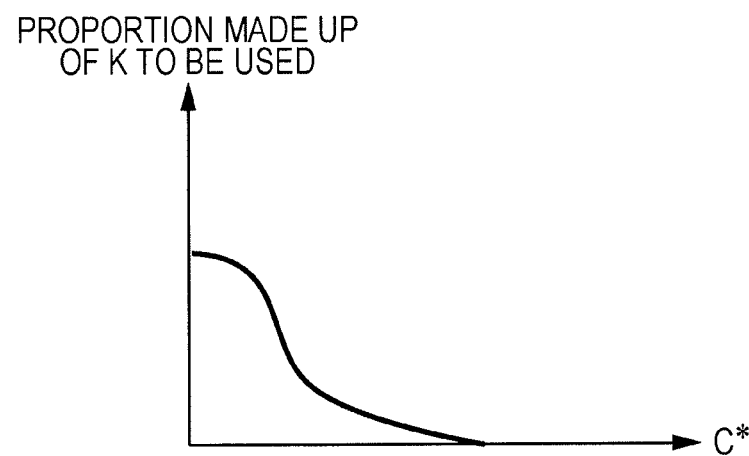

FIGS. 3A and 3B illustrate examples of the proportion made up of K to be used. As $\alpha K$, which is the GCR rate, for example, the function in accordance with the brightness ($L^*$) or the chroma ($C^*$) may be used. In the example shown in FIG. 3A, the proportion made up of K is decreased as the brightness is increased, and in the example shown in FIG. 3B, the proportion made up of K is decreased as the chroma is increased.

From K calculated by using the above-described equation (1) and $L^*a^*b^*$ representing the color to be reproduced, other color components, i.e., C, M, and Y, are calculated, thereby obtaining C, M, Y, and K. For example, if the relationship between the color signal (CMYK) supplied to the output apparatus and the value ($L^*a^*b^*$) obtained by measuring an output color component is represented by the function F, the C, M, and Y are calculated by the following equation (2).

$$(C, M, Y) = F^{-1}(L^*, a^*, b^*, K) \quad (2)$$

The function F representing the characteristics of the output apparatus is obtained by a known method. For example, a method using weighted regression or a learning model of the association (color transmission characteristics) by using a neural network, as disclosed in Japanese Unexamined Patent Application Publication Nos. 10-262157 and 2002-84434, may be used.

Figure 4:
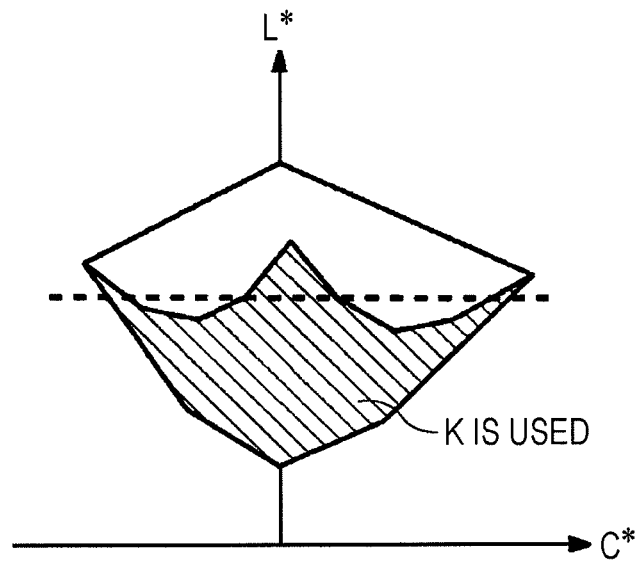
FIG. 4 illustrates an example of a color gamut using K when the proportion made up of K to be used is controlled.

FIG. 4 illustrates an example of a color gamut using K when the proportion made up of K to be used is controlled. In the examples using the GCR rate shown in FIGS. 3A and 3B, a higher priority is given to the image quality, and the amount of K to be used is decreased as the chroma ($C^*$) is increased. However, in equation (1), minK is used, and also, there are some color components which require the use of K even though such color components exhibit high chroma, as shown in FIG. 2A. Accordingly, the color range for which K is used is, for example, the color range shown in FIG. 4. For example, concerning the brightness indicated by the broken line, because of the characteristics of the GCR rate, K is used as follows. A large amount of K is used for the color positioned on the brightness axis. Then, the chroma increases to reach a point at which K is not used for a certain color, and the chroma is further increased to reach a point at which K is used again for a certain color.

Figure 5:
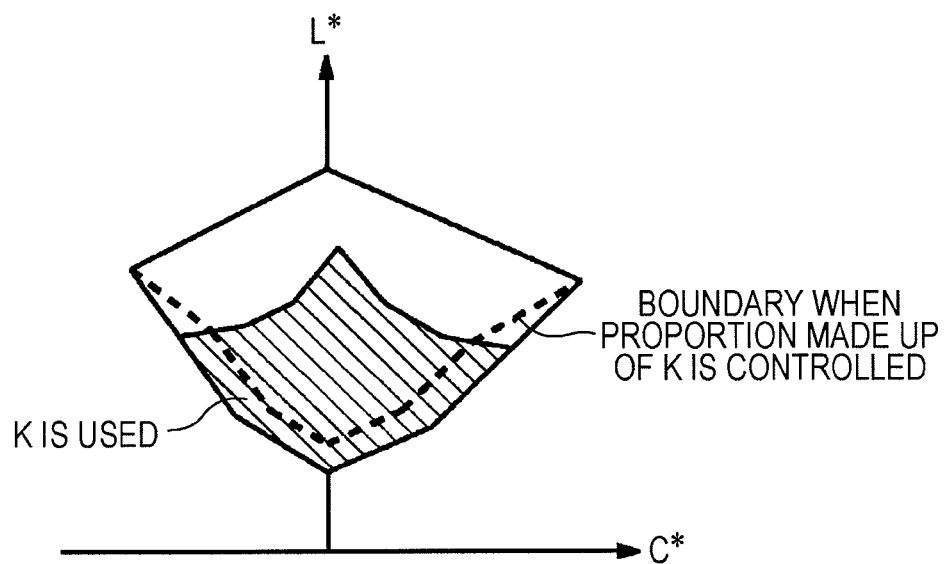
FIG. 5 illustrates another example of a color gamut using K when the proportion made up of K to be used is controlled.

FIG. 5 illustrates another example of a color gamut using K when the proportion made up of K to be used is controlled. In the example shown in FIG. 5, the use of K is controlled such that it is not increased as the chroma increases. In this case, in order to control the use of K, minK is used by using the following equation (3).

$$K = \alpha K \times \max K \quad (3)$$

In this case, colors having values lower than minK are not reproduced. For example, even if C, M, and Y are calculated on the basis of K obtained by equation (3), a significant value (e.g., 0% to 100% in terms of the area coverage) is not obtained.

In FIG. 5, the boundary of the color gamut to be reproduced by K calculated by using equation (3) is indicated by the broken line. Concerning the color components having brightness lower than that indicated by the broken line, although such color components would be reproduced in terms of the characteristics of the output apparatus, they are not reproduced since they do not satisfy the conditions for controlling the use of K. The conditions for controlling the use of K are design conditions, and the range of colors that satisfy the design conditions and are reproduced are a design color gamut. In the technique disclosed in Japanese Unexamined Patent Application Publication No. 2009-303019, the boundary of the design color gamut is calculated by search, and if the color ($L^*, a^*, b^*$) is changed while a search is being made, maxK or $\alpha K$ is also changed, and thus, it is necessary to search for K together with $L^*, a^*, b^*$. In contrast, in the following technique, the boundary of the design color gamut is determined not through a search.

Figure 6:
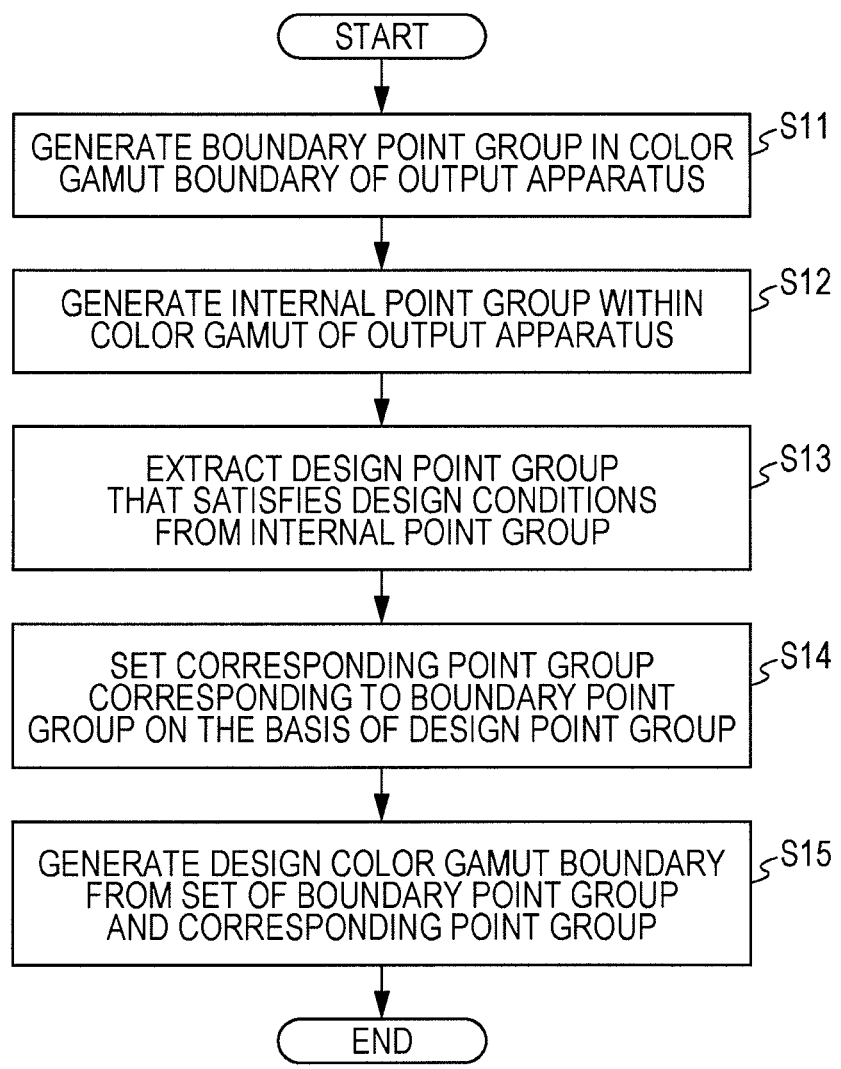
FIG. 6 is a flowchart illustrating an example of an operation in an exemplary embodiment of the invention.

FIG. 6 is a flowchart illustrating an example of an operation in an exemplary embodiment of the invention. In step S11, the boundary point group generator 1 generates a boundary point group, which is an $L^*, a^*, b^*$ point group existing on the boundary of the color gamut of the output apparatus in the CIELAB color space. The color gamut of the output apparatus may be the entire color gamut reproduced by the four CMYK components, as described above, or may be a color gamut reproduced by considering conditions other than design conditions. In this example, it is assumed that the color gamut is a color range when conditions that the total value of the color components is within a predetermined value (maximum total value) are imposed. For example, a point group on the boundary of the color gamut may be determined, as disclosed in Japanese Unexamined Patent Application Publication No. 2003-8912. In this technique, a polygon assembly that covers the boundary of a three-dimensional color space constituted of basic color components is first determined, and is then converted into a device-independent color space. Then, from the individual points of the converted polygon assembly, the boundary of the four color gamut is searched for, thereby determining a point group on the boundary of the color gamut of the output apparatus. Alternatively, a point group on the boundary of the color gamut may be determined, as disclosed in Japanese Unexamined Patent Application Publication No. 2005-63093. A point group on the boundary of a color gamut that satisfies the condition that the total value of C, M, Y, and K components in the device-dependent four color space is within the maximum total value is determined, and the determined point group is converted into a device-independent color space, thereby determining a boundary point group. A boundary point group may be determined by another method, or a predetermined boundary point group may be provided.

In step S12, the internal point group generator 2 provides plural color points ($L^*, a^*, b^*$) within the color gamut of the output apparatus, and sets such color points to be an internal point group. The color gamut of the output apparatus in this case is the color gamut having a boundary including the boundary point group generated by the boundary point group generator 1. A method for generating an internal point group is not restricted. One example is as follows. In a predetermined range of each point of ($L^*, a^*, b^*$), lattice points may be generated at certain intervals, and a determination may be made on the basis of the boundary point group generated by the boundary point group generator 1 as to whether the lattice points are contained within the color gamut of the output apparatus. Then, lattice points contained within the color gamut may be set as points forming the internal point group.

The above-described determination may be easily made by forming the boundary point group generated by the boundary point group generator 1 into a polygon. Alternatively, lattice points of CMYK components (0% to 100% in terms of the area coverage) may be generated, and among the generated lattice points, lattice points whose total value is within the maximum total value may be determined. Then, color points may be calculated by the following equation (4) by using the function F used in equation (2).

$$(L^*, a^*, b^*) = F(C, M, Y, K) \quad (4)$$

With this method, an internal point group can be obtained without making a determination as to whether the lattice points are contained within the color gamut of the output apparatus. Either of the methods may be used, or another method may be used to generate an internal point group.

In step S13, the design point group extracting unit 3 extracts, from the internal point group generated by the internal point group generator 2, a design point group, which is a point group that satisfies predetermined design conditions. In this example, as the design conditions, the proportion made up of K to be used is controlled. Accordingly, when the proportion made up of K to be used is determined for each of the points (L*, a*, b*) of the internal point group, a determination is made as to whether each point can be reproduced by the output apparatus by using K. Points that can be reproduced by the output apparatus are extracted and are formed into a design point group. Then, from the points (L*, a*, b*) of the internal point group and the values of K associated with such points, the values of C, M, and Y are determined by using equation (2). A determination is then made as to whether the obtained values of C, M, and Y are significant values (0% to 100% in terms of the area coverage).

The proportion made up of K to be used may be controlled by using, for example, the product of the proportion made up of K with respect to the brightness shown in FIG. 3A and the proportion made up of K with respect to the chroma shown in FIG. 3B. However, the proportion made up of K is not restricted to this example. The proportion made up of K ($\alpha K$) is expressed in a general format by the following equation (5):

$$\alpha K = fK(L^*, a^*, b^*) \quad (5)$$

where fK is the function of L*a*b*, and the configuration of the function is different depending on the target image quality.

Figure 7:
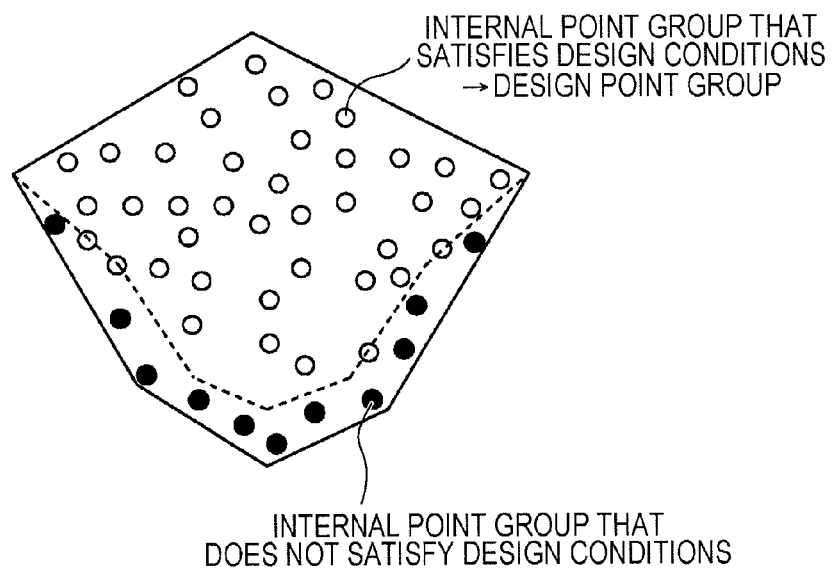
FIG. 7 illustrates examples of an internal point group and a design point group.

FIG. 7 illustrates examples of an internal point group and a design point group. In FIG. 7, the boundary of the color gamut of the output apparatus is indicated by the solid lines, and the boundary of the design color gamut that satisfies the design conditions is indicated by the broken line. The black circles and the white circles form the internal point group. As described with reference to FIG. 5, if the proportion made up of K is controlled, as shown in FIGS. 3A and 3B, and if K is determined by using equation (3), the color gamut, which is the range of colors, becomes narrower than that if the proportion made up of K is not controlled. Accordingly, in the internal point group shown in FIG. 7, color points that satisfy the design conditions and are to be reproduced (indicated by the white circles) and color points that are not to be reproduced (indicated by the black circles) are mixed. Then, the color points that are to be reproduced, as indicated by the white circles, are extracted, and are formed into a design point group. A determination as to whether the color points are to be reproduced may be made by determining whether C, M, and Y calculated by using inverse mapping of the function F indicated in equation (2) are significant values (0% to 100% in terms of the area coverage).

Figure 8:
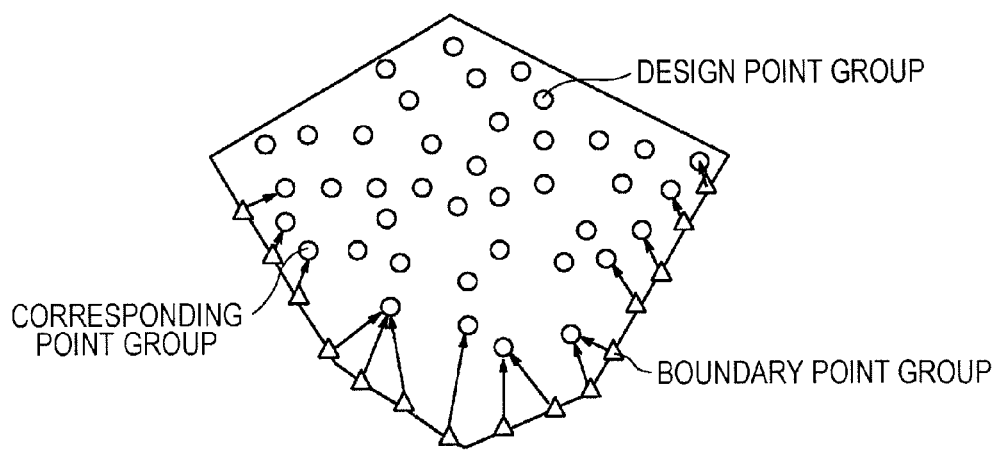
FIG. 8 illustrates an example of setting of a corresponding point group.

Referring back to FIG. 6, in step S14, the corresponding point group setting unit 4 sets points of a corresponding point group, which is a point group of the boundary of the color gamut represented by the design point group extracted by the design point group extracting unit 3, such that the set points of the corresponding point group are associated with the individual points of the boundary point group. FIG. 8 illustrates an example of setting of a corresponding point group. In this example, points of the design point group which are separated from the associated points of the boundary point group by the shortest distances may be determined and be set as the corresponding point group in association with the boundary point group. In FIG. 8, the points of the boundary point group are indicated by the triangles, and the points of the design point group are indicated by the white circles. The shortest distances from the individual points of the boundary point group to the points of the design point group are indicated by the arrows. The points at the heads of the arrows are set as the points of the corresponding point group (design point group), in association with the points at the tails of the arrows (points of the boundary point group).

Figure 9A:
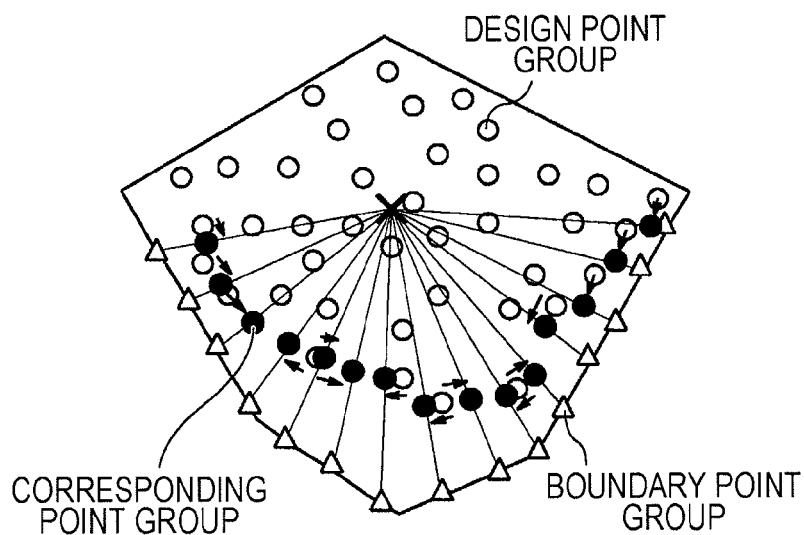
FIGS. 9A, 9B, and 9C illustrate another example of setting of a corresponding point group.
Figure 9B:
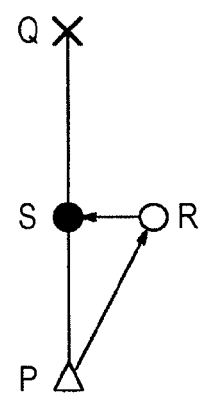
Figure 9C:
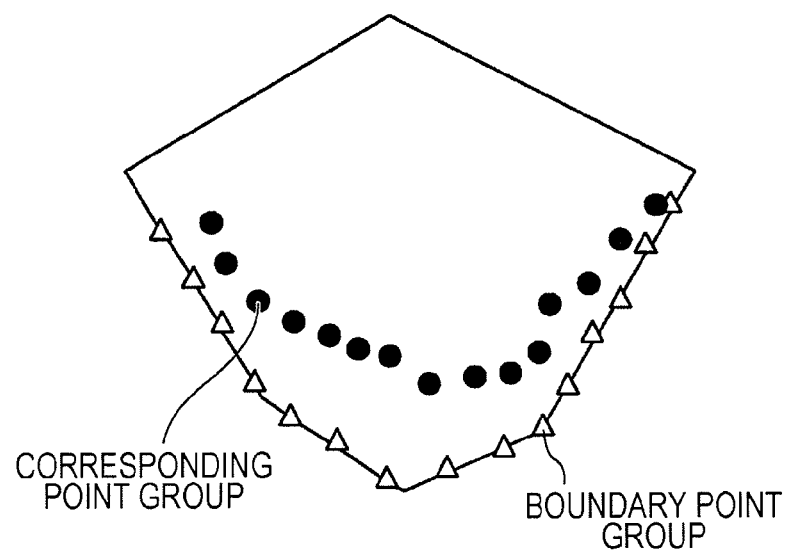

FIGS. 9A through 9C illustrate another example of setting of a corresponding point group. In this example, straight lines from the individual points of the boundary point group to a predetermined internal point of the color gamut are set. Then, points of the design point group which are separated from the associated points of the boundary point group by the shortest distances are selected, and on the basis of the selected points, points which form a corresponding point group are set. FIG. 9B illustrates an example of setting of a point of a corresponding point group in association with a certain point of the boundary point group. A point Q, which is a predetermined point inside the color gamut, is indicated by X, a point P of the boundary point group is indicated by a triangle, and a point R of the design point group which is separated from the point P by the shortest distance is indicated by a white circle. In this example, a point S obtained by projecting the point Q on the straight line extending from the point P to the point Q is set as a point of the corresponding point group, and the point P of the boundary point group and the point S of the corresponding point group are associated with each other. The above-described setting and associating of the corresponding point group is performed for each of the points of the boundary point group. The state of setting and associating of the corresponding point group is shown in FIG. 9A. The points indicated by the black circles are points of the corresponding point group, and are associated with the points of the boundary point group on the straight lines. FIG. 9C illustrates the boundary point group and the corresponding point group.

In the method shown in FIG. 8, points of the design point group which are separated from the associated points of the boundary point group by the shortest distances are set as the points of the corresponding point group. In this method, plural points of the boundary point group may be associated with one point of the design point group. In the example shown in FIG. 8, two or three points of the boundary point group are associated with one point of the design point group. In contrast, in the method shown in FIGS. 9A through 9C in which points of the corresponding point group are set on the straight lines, unless plural points of the boundary point group exist on the same straight line, the one-to-one correspondence between the points of the boundary point group and the points of the corresponding point group is maintained. Additionally, the relative positional relationship among the points of the boundary point group is also maintained in the corresponding point group.

Referring back to FIG. 6, in step S15, the design color gamut boundary generator 5 generates a design color gamut boundary, which is a color gamut boundary that satisfies design conditions, by using a set of the boundary point group and the corresponding point group. In this case, the points of the corresponding point group may be directly utilized as the points of the design color gamut boundary. For example, if a point group which has been generated for forming the boundary of the color gamut of the output apparatus is used as the boundary point group, and if a corresponding point group which reflects the relative positions of the points of the boundary point group, as shown in FIGS. 9A and 9C, has been obtained, the plotting of the points of the boundary point group is reflected in the points of the corresponding point group, thereby representing a design color gamut boundary.

Alternatively, a new design color gamut may be generated by using a set of the boundary point group and the corresponding point group. In this case, the points on the boundary of the color gamut of the output apparatus when the boundary point group has been generated by the boundary point group generator 1 are converted into points on a design color gamut boundary represented by the corresponding point group. This conversion is implemented by mapping from L*a*b* to L*a*b*' if the color space is the CIELAB color space, and the function of mapping is determined by a set of a boundary point group and a corresponding point group associated with each other. The function may be obtained by a statistical method, and, for example, a method using weighted regression or a learning model of the association (color transmission characteristics) by using a neural network, as disclosed in Japanese Unexamined Patent Application Publication Nos. 10-262157 and 2002-84434, may be used. The points on the design color gamut boundary are determined by the following equation (6):

$$(L^*, a^*, b^*)' = G(L^*, a^*, b^*) \quad (6)$$

where G is the function of mapping, (L*, a*, b*) denote the points on the boundary of the color gamut when the boundary point group has been generated by the boundary point group generator 1, and (L*, a*, b*)' denote points on the design color gamut boundary to be determined. The design color gamut boundary is generated in this manner.

Figure 10:
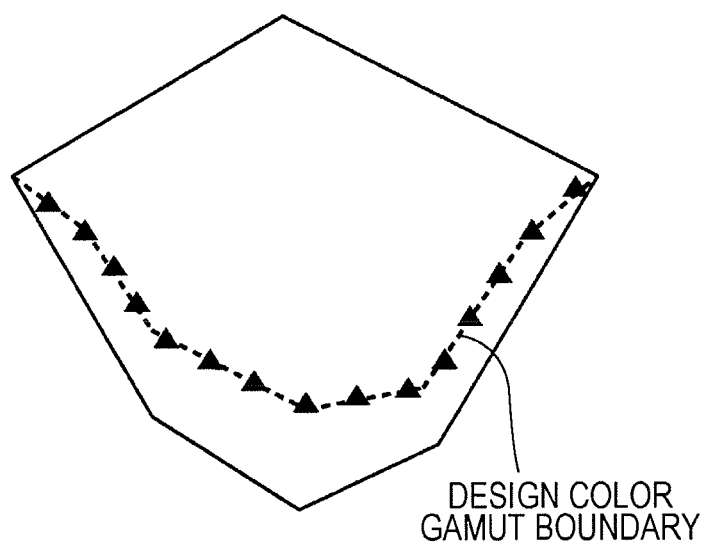
FIG. 10 illustrates an example of a generated design color gamut boundary.

FIG. 10 illustrates an example of the generated design color gamut boundary. The color gamut boundary generated by the design color gamut boundary generator 5 is indicated by the broken line. The black triangles designate points on the design color gamut boundary generated by using the function which is obtained from a set of the boundary point group and the corresponding point group. This color gamut boundary is a color gamut boundary when the proportion made up of K discussed with reference to FIG. 5 is controlled.

In the above-described specific example, a case in which the output apparatus utilizes four C, M, Y, and K color components has been discussed. There are some output apparatuses which output images by utilizing one or more color components that contribute to an increase in the color gamut to achieve a higher chroma. A description will be given below of a case in which an orange (O) component is utilized in addition to the C, M, Y, and K components.

Figure 11A:
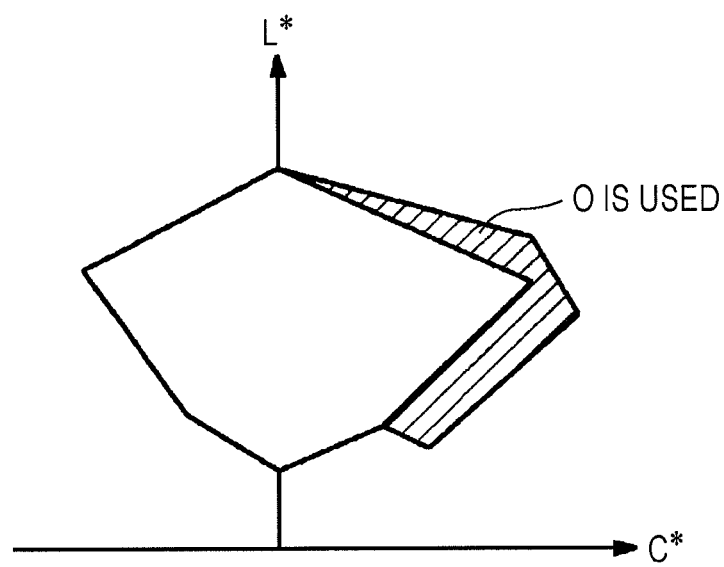
FIGS. 11A and 11B illustrate examples of a color gamut when a specific color is utilized.
Figure 11B:
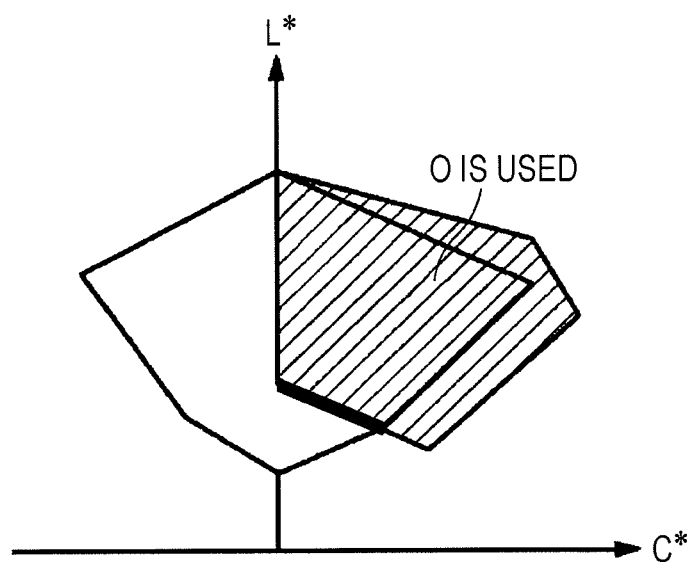

FIGS. 11A and 11B illustrate examples of the color gamut when a specific color is utilized. FIGS. 11A and 11B illustrate examples of the color gamut of an output apparatus utilizing the O component. The examples of the color gamut shown in FIGS. 11A and 11B are represented by a plane including the brightness axis and colors represented by the O component in the CIELAB color space. In FIG. 11A, the color gamut indicated by the hatched portion is a range of colors which is to be reproduced, not only by the four C, M, Y, and K color components, but also by the O component. In the example shown in FIG. 11A, the minimal amount of O component is utilized, and the minimal amount of O component is called the "minimum O". In contrast, in the example shown in FIG. 11B, the maximum amount of O component is utilized. Even for colors represented by C, M, and Y, if M and Y are replaced by O, such colors contain the O component. Accordingly, the colors in the region indicated by the hatched portion in FIG. 11B are reproduced by utilizing O. The O component which is utilized to the maximum is called "maximum O". Regardless of the case of the minimum O shown in FIG. 11A or the maximum O shown in FIG. 11B, the configuration and the size of the color gamut remain the same, and in each of the colors, the use of the O component is adjusted in a range from the minimum O to the maximum O.

In the case of the use of the minimum O, when the chroma becomes higher than that of the boundary of the C, M, Y, and K components, the O component increases as the chroma increases. In this case, the O component increases more sharply than the case of the maximum O, thereby decreasing the continuity of colors in the boundary of the C, M, Y, and K components. In the case of the use of the maximum O, the continuity of colors may also be decreased since the O component is utilized in some areas and the O component is not utilized in the other areas around the boundary indicated by the thick line in FIG. 11B. Accordingly, the proportion made up of O to be used is controlled in a range from the minimum O to the maximum O.

In the range from the minimum O (represented by minO) shown in FIG. 11A to the maximum O (represented by maxO) shown in FIG. 11B, in order to use the color gamut up to the outermost boundary, the amount of O to be used is controlled by the following equation (7):

$$O = \alpha O \times \max O + (1 - \alpha O) \times \min O \quad (7)$$

where αO is the control coefficient determined in accordance with L*a*b*.

Figure 12A:
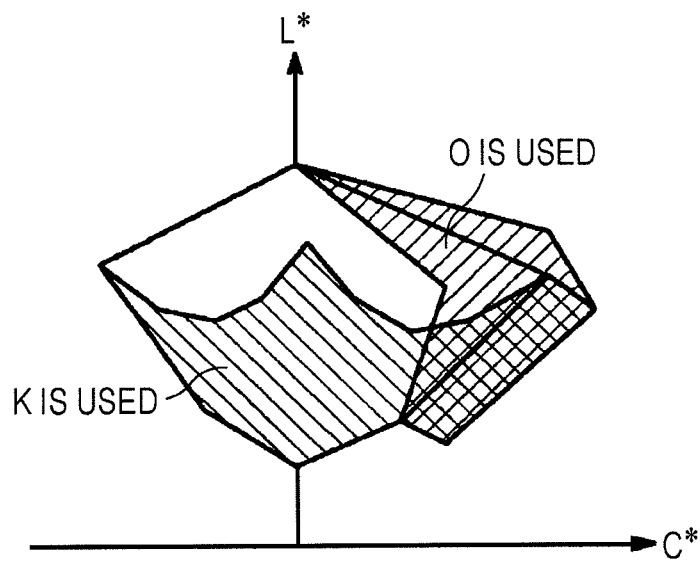
FIGS. 12A and 12B illustrate examples of a color gamut using K and O when the proportions of K and O to be used are controlled.
Figure 12B:
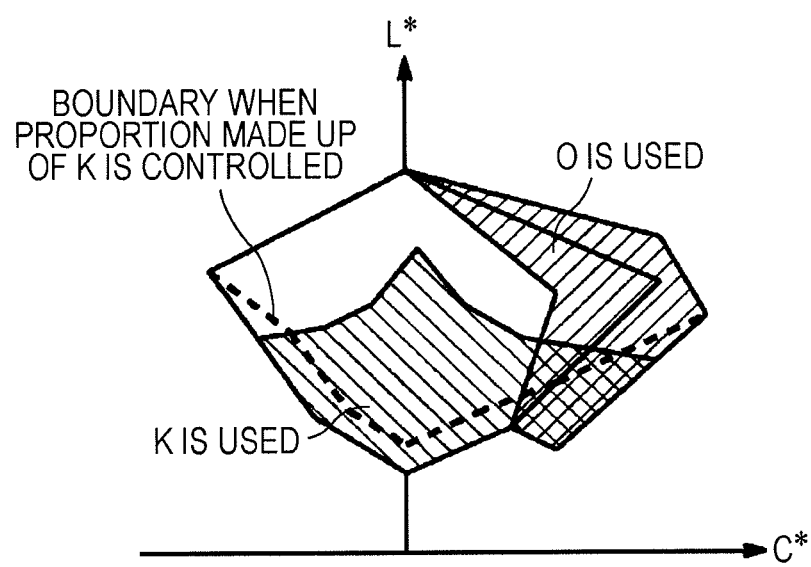

FIGS. 12A and 12B illustrate examples of the color gamut using K and O when the proportions of K and O to be used are controlled. As in the above-described specific example, K, as well as O, is controlled. For L*a*b* in each of the examples, the range of K is controlled such that it satisfies an equation minK≤K≤maxK by using equation (1), and the range of O is controlled by using equation (7). Then, as shown in FIG. 12A, the color gamut in which K is utilized is indicated by the hatched portion rising upward to the left, and the color gamut in which O is utilized is indicated by the hatched portion rising upward to the right.

However, as stated above, if K is controlled by using equation (3) in order to implement the target image quality, there may be some colors that are not reproduced. In FIG. 12B, the boundary of the color gamut reproduced under the control of the proportion made up of K by using equation (3) is indicated by the broken line. The color components having brightness lower than that indicated by the broken line are not reproduced due to the control of K. In this specific example, conditions for controlling the use of K that changes the color gamut are design conditions. If the color gamut is changed by controlling the proportion made up of O, conditions for controlling the use of O are design conditions, or they may be set as design conditions, together with conditions for controlling the use of K.

An operation of an output apparatus that utilizes five C, M, Y, K, and O components will be described below with reference to the flowchart of FIG. 6. In step S11, the boundary point group generator 1 generates a boundary point group on a boundary of the color gamut of an output apparatus. In this specific example, the output apparatus utilizes the five C, M, Y, K, and O components, and the boundary of the color gamut including five or more color components may be obtained by a known method, such as converting colors of the boundary of a color gamut in a color space (in this case, a CMYKO color space) of the output apparatus into a device-independent color space (in this case, a CIELAB color space), as disclosed in Japanese Unexamined Patent Application Publication No. 2010-187144. Then, a boundary point group is generated on the boundary of the obtained color gamut. Alternatively, the boundary point group may be determined in accordance with the boundary of a color gamut on which conditions other than design conditions are imposed. For example, a point group on the boundary of the color gamut that satisfies the maximum total value may be calculated and be set as the boundary point group.

In step S12, the internal point group generator 2 disposes plural color points (L*, a*, b*) within the color gamut of the output apparatus utilizing five C, M, Y, K, and O components, and sets such color points to be an internal point group. The color gamut is a color gamut when the boundary point group has been generated by the boundary point group generator 1, and an internal point group is generated in a manner similar to that for the internal point group in the case of the above-described four colors.

In step S13, the design point group extracting unit 3 extracts, from the internal point group generated by the internal point group generator 2, a design point group, which is a point group that satisfies predetermined design conditions. In this example, as the design conditions, as well as the proportion made up of K to be used, the proportion made up of O to be used, is controlled. Accordingly, for each of the points (L*, a*, b*) of the internal point group, the proportion made up of K and the proportion made up of O are determined. It is then determined whether each of the color components by using the determined proportions of K and O is to be reproduced by the output apparatus, and points that are to be reproduced are extracted and are formed into the design point group.

For example, if the relationship between a color signal (CMYKO) supplied to the output apparatus and the value obtained by measuring the colors (L*, a*, b*) is represented by the function F, the function F representing the characteristics of the output apparatus is expressed by the following equation (8).

$$(L^*, a^*, b^*) = F(C, M, Y, K, O) \quad (8)$$

By the use of this function F, K and O are determined by L*a*b*, and from the points (L*, a*, b*) of the internal point group and the values of K and O corresponding to those points, the remaining components C, M, and Y are calculated by the following equation (9).

$$(C, M, Y) = F^{-1}(L^*, a^*, b^*, K, O) \quad (9)$$

Then, a determination is made as to whether the calculated values of C, M, and Y are significant values (0% to 100% in terms of the area coverage). Points of internal point group having significant values are then extracted and are formed into the design point group.

The proportion made up of K to be used may be controlled in the above-described specific method, such as that shown in FIGS. 3A and 3B. The proportion made up of O may be controlled by, for example, a method disclosed in Japanese Unexamined Patent Application Publication No. 2010-252309. In this method, the proportion made up of O is set to be greater as the chroma is higher and as the distance from the hue of O to a certain color is smaller, or the proportion made up of O is set by restricting a color range which includes the hue of O in the chroma-hue plane. Alternatively, as disclosed in Japanese Unexamined Patent Application Publication No. 2011-009843, the proportion made up of O may be controlled in the following manner. The proportion made up of K may be controlled by minimizing the value of O, and the maximum value of O corresponding to the obtained value of K may be determined. Then, the proportion made up of O may be controlled in the range from the minimum value to the maximum value of O.

Figure 13:
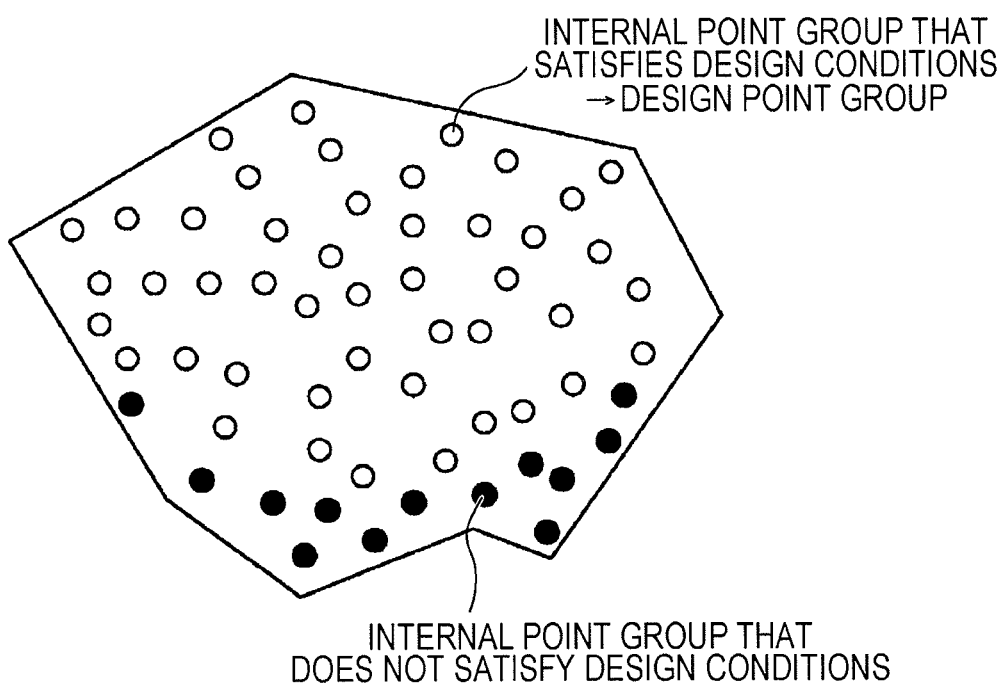
FIG. 13 illustrates examples of an internal point group and a design point group when K and O are utilized.

FIG. 13 illustrates examples of an internal point group and a design point group when K and O are utilized. In FIG. 13, the black circles and the white circles indicate an internal point group, among which the white circles indicate a design point group. The points of the internal point group indicated by the black circles are color points that would be reproduced by an output apparatus if design conditions for controlling the proportion made up of K are not imposed, but are color points that are not reproduced if such design conditions are imposed. Those points of the internal point group are excluded from the design point group. The points of the internal point group indicated by the white circles are color points that are to be reproduced by the output apparatus even under the above-described design conditions, and are extracted as points of the design point group.

Figure 14A:
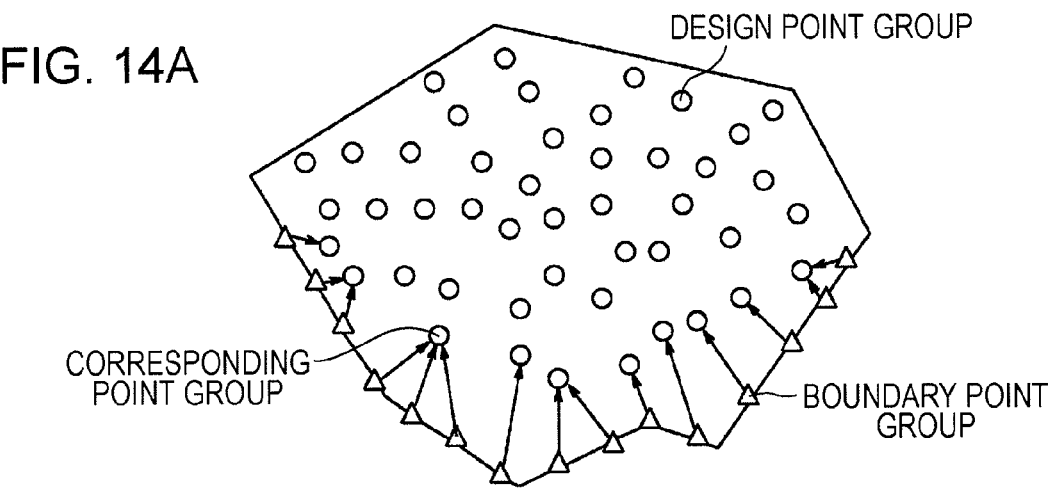
FIGS. 14A, 14B, and 14C illustrate an example of setting of a corresponding point group when K and O are utilized.
Figure 14B:
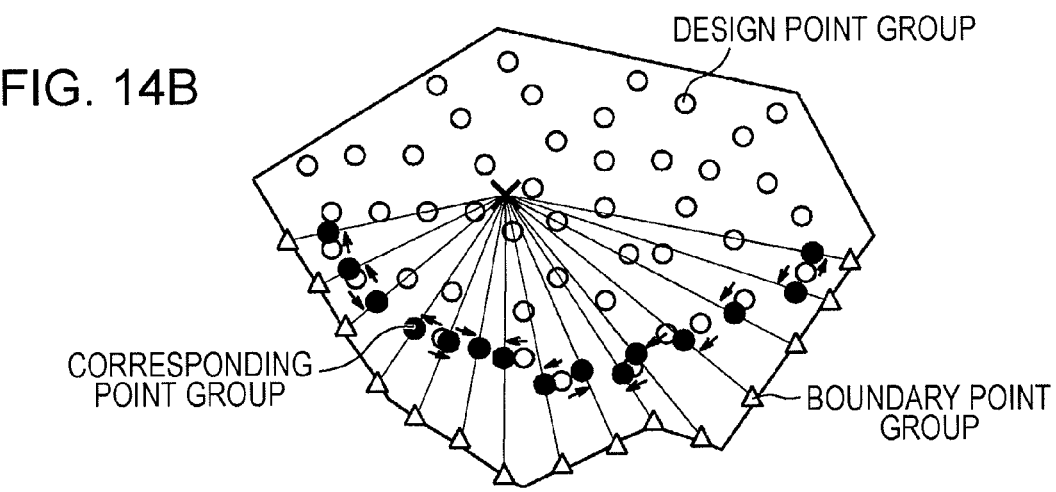
Figure 14C:
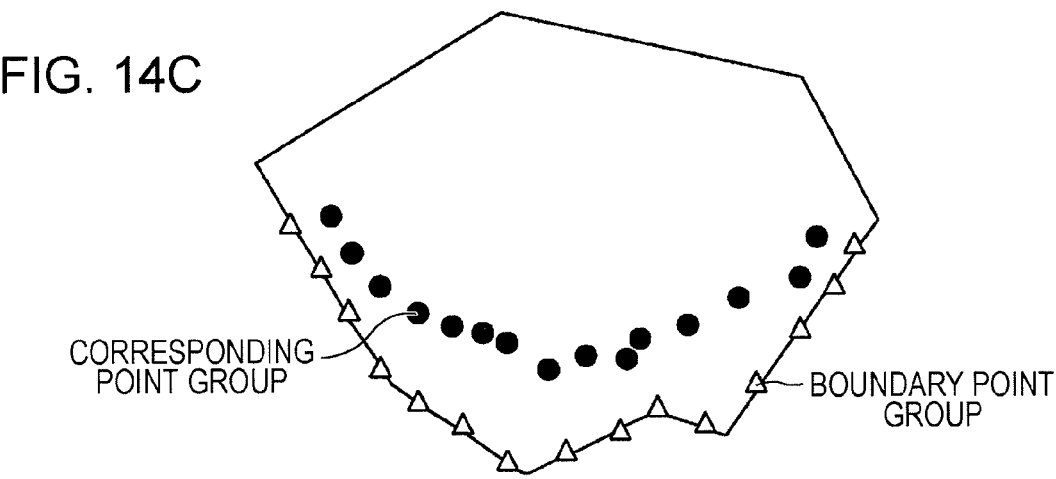

In step S14, the corresponding point setting unit 4 sets, in association with the individual points of the boundary point group, points of a corresponding point group, which is a point group of a boundary of a color gamut represented by the design point group extracted by the design point group extracting unit 3. FIGS. 14A, 14B, and 14C illustrate an example of setting of a corresponding point group when K and O are utilized. As an approach to setting a corresponding point group, the example shown in FIG. 8 or the example shown in FIGS. 9A through 9C may be utilized. The approach discussed with reference to FIG. 8 is shown in FIG. 14A in which points of the design point group which are separated from the associated points of the boundary point group by the shortest distances may be determined and be set as points of the corresponding point group in association with the boundary point group. The approach discussed with reference to FIGS. 9A through 9C is shown in FIG. 14B. In this approach, on straight lines extending from the individual points of the boundary point group to a predetermined point inside the color gamut, corresponding points may be set on the basis of the points of the design point group which are positioned closest to the points of associated points of the boundary point group. The boundary configuration shown in FIGS. 14A and 14B are different from those shown in FIGS. 8 and 9C. An example of a set of a boundary point group and a corresponding point group obtained by the approach shown in FIG. 14B is shown in FIG. 14C.

Figure 15:
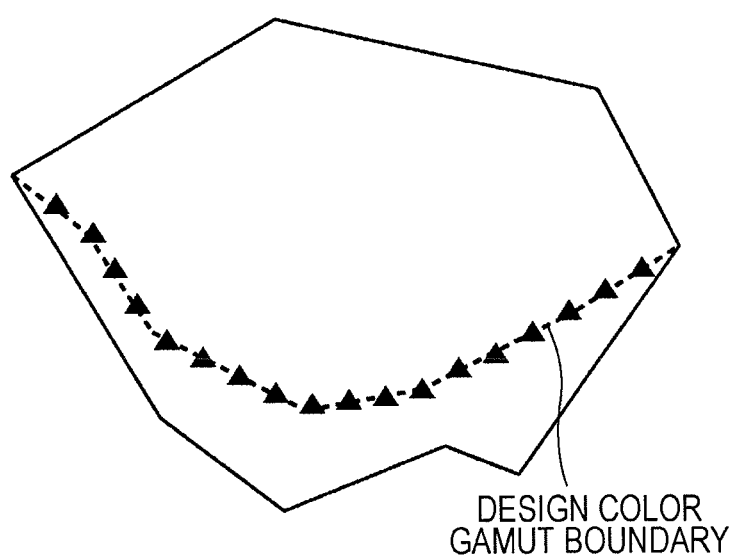
FIG. 15 illustrates an example of a design color gamut boundary generated when K and O are utilized.

In step S15, the design color gamut boundary generator 5 generates a design color gamut boundary, which is a color gamut boundary that satisfies design conditions. The generation of a design color gamut boundary may be performed as in the above-described specific example shown in FIG. 10. If points of a design color gamut boundary are newly generated, they may be calculated by utilizing equation (6). FIG. 15 illustrates an example of a design color gamut boundary generated when K and O are utilized. The boundary of the design color gamut generated by the design color gamut boundary generator 5 is indicated by the broken line. In FIG. 15, the black triangles indicate points on the boundary of the design color gamut generated by using a function obtained from a set of the boundary point group and the corresponding point group. The color gamut boundary shown in FIG. 15 is a color gamut boundary when K and O are utilized and when the proportion made up of K to be used is set as design conditions, as discussed in FIG. 12B.

In the above-described example in which K and O are utilized, the proportion made up of K is used as design conditions. If, however, the range of colors to be reproduced is changed in accordance with the proportion made up of O, the proportion made up of O is used as design conditions, or both of the proportions of K and O may be used as design conditions.

In the above-described two specific examples, C, M, and Y are used as basic color components, and K, or K and O are used. Color components added to the basic color components are not restricted to K and O, and various colors, such as green (G), violet (V), red (R), and blue (B), may be used. The number of color components to be used is not restricted to four or five, and may be six or more. For example, seven color components, such as C, M, Y, K, R, G, and B, may be used. As the basic color components, R, G, and B may be used. The color space of each point group is not restricted to the CIELAB color space, but may be another device-independent color space, such as an Luv color space or a YCbCr color space.

In the above-described two specific examples, the proportion made up of K to be used is set as design conditions. However, if conditions for another color component are imposed so as to change the range of colors to be reproduced, such conditions may be set as design conditions. Conditions for several color components may be set as design conditions, for example, both of the proportions of K and O may be set as design conditions, or the maximum of the total value of the individual color components may be set as design conditions.

The obtained design color gamut boundary may be used, for example, when converting colors which are not included in the design color gamut into colors included in the design color gamut. Examples of colors which are not included in the design color gamut are colors included in a color gamut on which design conditions are not imposed, a color gamut of another output apparatus, a color gamut obtained by an image obtaining apparatus, a color gamut in an sRGB color space, or a color gamut in various color spaces including device-independent color spaces. Among such colors, at least colors which are not included in a design color gamut may be converted into some or all of colors in the design color gamut. An image processing apparatus including a conversion unit that performs such conversion may be provided. Such a conversion unit may also be used for determining whether a certain color is included in a design color gamut, or may be used for another purpose.

Figure 16:
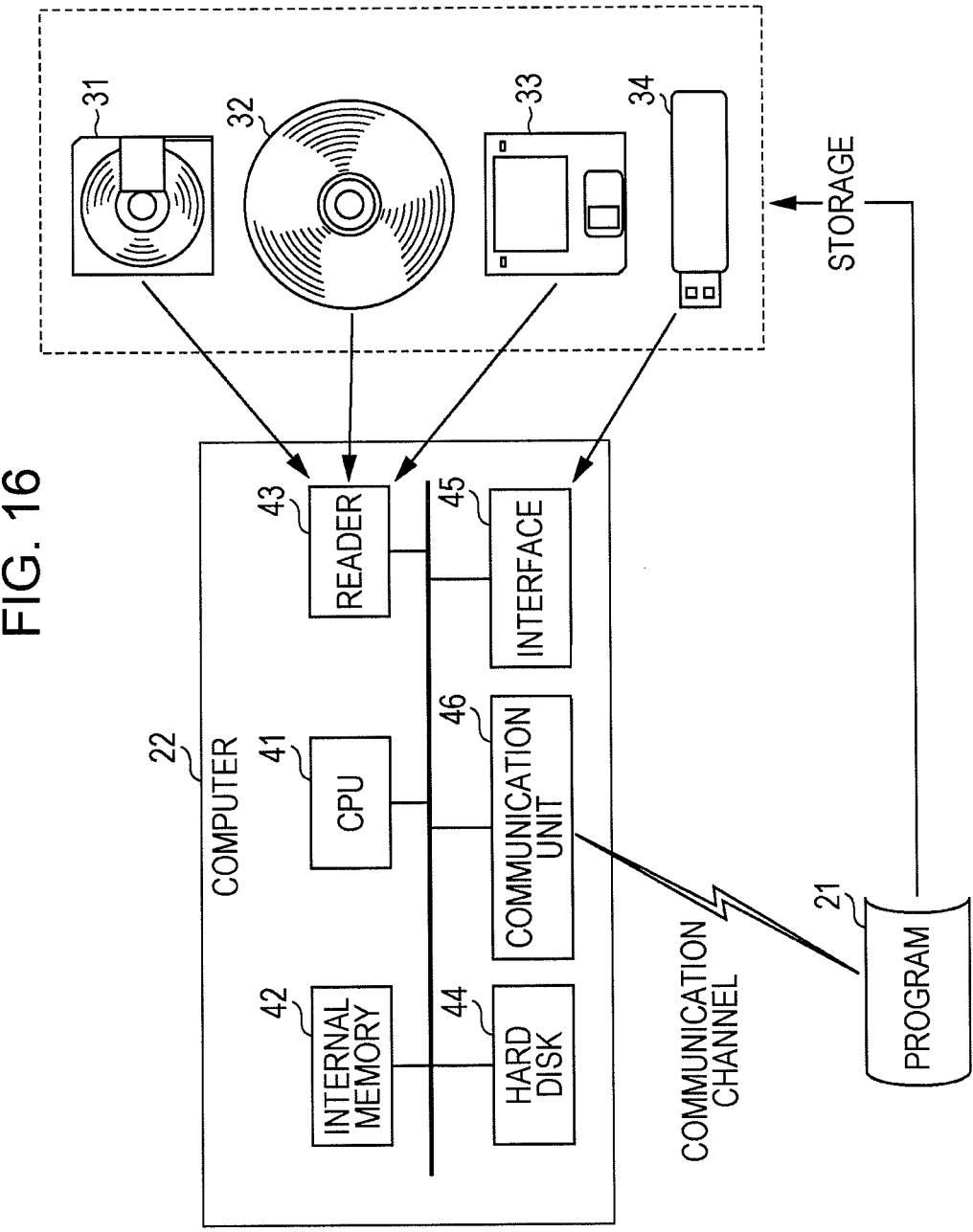
FIG. 16 illustrates an example of a computer program implementing the functions described in an exemplary embodiment of the invention and also illustrates examples of a storage medium and a computer in which such a computer program is stored.

FIG. 16 illustrates an example of a computer program 21 implementing the functions of the above-described exemplary embodiment of the invention and also illustrates an example of a storage medium or a computer 22 in which such a computer program is stored. The computer 22 includes a central processing unit (CPU) 41, an internal memory 42, a reader 43, a hard disk 44, an interface 45, and a communication unit 46.

Some or all of the functions of the above-described exemplary embodiment of the invention may be implemented as a result of executing the program 21 by the computer 22. In this case, the program 21 or data used for the program 21 may be stored in a storage medium read by the computer 22. The storage medium triggers a change in energy, such as magnetic, optical, or electric energy, in the reader 43 included in hardware resources of the computer 22, in accordance with the content of the program 21, and transmits the content described in the program 21 to the reader 43 in the form of a signal associated with magnetic, optical, or electric energy. Examples of such a storage medium are a magneto-optic disk 31, an optical disc 32 (including a compact disc (CD), a digital versatile disc (DVD), etc.), a magnetic disk 33, and a memory 34 (including an integrated circuit (IC) card, a memory card, a flash memory, etc.). Such a storage medium is not restricted to a portable type.

The program 21 is stored in such a storage medium, and the storage medium is set, for example, in the reader 43 or the interface 45 of the computer 22. The program 21 is then read from the computer 22 into the internal memory 42 or the hard disk 44 (including a magnetic disk, a silicon disk, etc.). The CPU 41 then executes the program 21, thereby implementing some or all of the functions of the above-described exemplary embodiment of the invention. Alternatively, the program 21 may be transferred to the computer 22 via a communication channel and may be received by the communication unit 46 of the computer 22. Then, the program 21 may be stored in the internal memory 42 or the hard disk 44 and be executed by the CPU 41.

The computer 22 may be connected to various devices via the interface 45. For example, a display unit that displays information thereon or a receiver that receives information from a user may be connected to the computer 22. An image forming apparatus may also be connected to the computer 22 via the interface 45 so as to form images in accordance with a color signal generated as a result of performing color processing by the use of a design color gamut. The components do not have to be operated in one computer, but may be operated in different computers depending on the process steps. The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing apparatus comprising:
    a point group generator that generates a point group existing in a color gamut of an output apparatus;
    a design point group extracting unit that extracts, from the point group, a design point group, which is a point group that satisfies predetermined design conditions;
    a corresponding point group setting unit that sets, on the basis of the design point group, a corresponding point group, which is a point group indicating a boundary of a color gamut represented by the design point group, such that points of the corresponding point group are associated with individual points of a boundary point group existing on a boundary of the color gamut of the output apparatus; and
    a design color gamut boundary generator that generates a boundary of a design color gamut, which is a color gamut that satisfies the predetermined design conditions, by using a set of the boundary point group and the corresponding point group.

2. The color processing apparatus according to claim 1, wherein the output apparatus outputs an image by using, as wells as basic color components necessary for outputting color images, at least one color component among color components which increase a color gamut in a direction in which the brightness decreases and color components which increase a color gamut in a direction in which the chroma increases.

3. The color processing apparatus according to claim 1, wherein the point group is a point group in a device-independent color space, and the design point group extracting unit determines whether conversion of an internal point group, which is a point group positioned within the color gamut, into a color space dependent on the output apparatus under the predetermined design conditions is significant, and extracts, as the design point group, a point group for which it is determined that conversion of the point group into a color space dependent on the output apparatus is significant.

4. The color processing apparatus according to claim 1, wherein the corresponding point group setting unit sets the corresponding point group on the basis of distances from the individual points of the boundary point group to associated points of the design point group.

5. The color processing apparatus according to claim 1, wherein the corresponding point group setting unit sets straight lines extending from the individual points of the boundary point group to a predetermined point positioned inside the color gamut, and selects points of the design point group associated with the individual points of the boundary point group on the basis of distances from the individual points of the boundary point group to the points of the design point group, thereby setting points of the corresponding point group on the straight lines on the basis of the selected points of the design point group.

6. The color processing apparatus according to claim 1, wherein the design color gamut boundary generator forms a mapping model from which the corresponding point group is output in response to an input of the boundary point group, and maps, by using the mapping model, points on the boundary of the color gamut of the output apparatus into points of a boundary of a color gamut that satisfies the predetermined design conditions, thereby generating the boundary of the design color gamut.

7. The color processing apparatus according to claim 2, wherein the output apparatus outputs an image by using, as wells as basic color components necessary for outputting color images, a black component and at least one specific color among color components which increase a color gamut in a direction in which the brightness decreases and color components which increase a color gamut in a direction in which the chroma increases.

8. A color processing method comprising:
generating a point group existing in a color gamut of an output apparatus;
extracting, from the point group, a design point group, which is a point group that satisfies predetermined design conditions;
setting, on the basis of the design point group, a corresponding point group, which is a point group indicating a boundary of a color gamut represented by the design point group, such that points of the corresponding point group are associated with individual points of a boundary point group existing on a boundary of the color gamut of the output apparatus; and
generating a boundary of a design color gamut, which is a color gamut that satisfies the predetermined design conditions, by using a set of the boundary point group and the corresponding point group.

9. A non-transitory computer readable medium storing a program causing a computer to execute a process, the process comprising:
generating a point group existing in a color gamut of an output apparatus;
extracting, from the point group, a design point group, which is a point group that satisfies predetermined design conditions;
setting, on the basis of the design point group, a corresponding point group, which is a point group indicating a boundary of a color gamut represented by the design point group, such that points of the corresponding point group are associated with individual points of a boundary point group existing on a boundary of the color gamut of the output apparatus; and
generating a boundary of a design color gamut, which is a color gamut that satisfies the predetermined design conditions, by using a set of the boundary point group and the corresponding point group.

* * * * *